(12) United States Patent
Horsley et al.

(10) Patent No.: US 10,003,695 B2
(45) Date of Patent: Jun. 19, 2018

(54) DATA COMMUNICATION

(71) Applicant: BRITISH TELECOMMUNICATIONS PUBLIC LIMITED COMPANY, London (GB)

(72) Inventors: Ian E Horsley, London (GB); Trevor P Linney, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days. days.

(21) Appl. No.: 15/300,918

(22) PCT Filed: Mar. 30, 2015

(86) PCT No.: PCT/GB2015/050955
§ 371 (c)(1),
(2) Date: Sep. 30, 2016

(87) PCT Pub. No.: WO2015/150758
PCT Pub. Date: Oct. 8, 2015

(65) Prior Publication Data
US 2017/0019538 A1    Jan. 19, 2017

(30) Foreign Application Priority Data

Mar. 31, 2014 (EP) .................................... 14250068
Apr. 2, 2014 (GB) .................................... 1405944.8

(51) Int. Cl.
*H03M 3/02* (2006.01)
*H04M 11/06* (2006.01)
(Continued)

(52) U.S. Cl.
CPC ........... *H04M 11/062* (2013.01); *H04L 43/08* (2013.01); *H04L 47/38* (2013.01); *H04L 5/0007* (2013.01);
(Continued)

(58) Field of Classification Search
None
See application file for complete search history.

(56) References Cited

U.S. PATENT DOCUMENTS

| 2010/0232486 A1* | 9/2010 | Starr | H04B 3/32 |
| | | | 375/222 |
| 2014/0321298 A1* | 10/2014 | Chow | H04L 41/083 |
| | | | 370/252 |

FOREIGN PATENT DOCUMENTS

| EP | 1 998 524 | 12/2008 |
| EP | 2 120 381 | 11/2009 |

(Continued)

OTHER PUBLICATIONS

International Search Report and Written Opinion of the International Searching Authority dated Jun. 12, 2015 issued in corresponding Application No. PCT/GB2015/050955 (8 pages).

(Continued)

*Primary Examiner* — Maria El-Zoobi
(74) *Attorney, Agent, or Firm* — Nixon & Vanderhye P.C.

(57) ABSTRACT

A method of controlling a digital subscriber line (DSL) transceiver for use in transferring data over a DSL connection, the method comprising: monitoring operation of the DSL connection; detecting that the DSL connection is operating in a low power mode in which the signal power applied to the DSL connection by the DSL transceiver is at a first level below a power threshold value; increasing the signal power applied to the DSL connection to a second level above the power threshold value; recording data indicative of performance of the DSL connection with signal power applied to the DSL connection at the second level; and modifying DSL transceiver attributes based on the recorded data indicative of performance, to change operation of the DSL transceiver in transferring data over the DSL connection.

20 Claims, 5 Drawing Sheets

(51) Int. Cl.
    *H04L 12/26*     (2006.01)
    *H04L 12/811*    (2013.01)
    *H04L 5/00*      (2006.01)
    *H04L 12/64*     (2006.01)

(52) U.S. Cl.
    CPC ...... *H04L 2012/6478* (2013.01); *Y02D 50/44* (2018.01)

(56) References Cited

FOREIGN PATENT DOCUMENTS

EP    2 136 522    12/2009
EP    2 437 434    4/2012

OTHER PUBLICATIONS

European Search Report dated Sep. 29, 2014 issued in corresponding Application No. EP 25 36 0068 (3 pages).
"Splitterless asymmetric digital subscriber line (ADSL) transceivers" Series G: Transmission Systems and Media, Digital Systems and Networks—Digital transmission systems—Digital sections and digital line system—Access networks, ITU-T Telecommunication Standardization Sector of ITU G.992-2 (Jun. 1999) (179 pages).
"Asymmetric digital subscriber line transceivers—2 (ADSL2)", Systems and Media, Series G: Transmission Systems and Media, Digital Systems and Networks—Digital sections and digital line system Access networks. ITU-T Telecommunication Standardization Sector of ITU Recommendation ITU-T G.992-3 Annex C (Apr. 2009) (296 pages).
Asymmetric digital subscriber line transceivers—2 (ADSL2), Systems and Media, Series G: Transmission Systems and Media, Digital Systems and Networks—Digital sections and digital line system Access networks. ITU-T Telecommunication Standardization Sector of ITU Recommendation ITU-T G.992-3 (Apr. 2009) (404 pages).
"Splitterless asymmetric digital subscriber line transceivers 2 (splitterless ADSL2)" Series G: Transmission Systems and Media, Digital Systems and Networks—Digital sections and digital line system—Access networks, ITU-T Telecommunication Standardization Sector of ITU G.992-4 (Jul. 2002) (24 pages).
"OAM functions and mechanisms for Ethernet based networks" Series G: Transmission Systems and Media, Digital Systems and Networks, Packet over Transport aspects—Ethernet over Transport aspects, Series Y: Global Information Infrastructure, Internet Protocol Aspects and Next-Generation Networks, ITU-T Telecommunication Standardization Sector of ITU G.8013/Y.1731 (Nov. 2013) (95 pages).
"Physical layer management for digital subscriber line transceivers", Series G: Transmission Systems and Media, Digital Systems and Networks—Digital sections and digital line system—Access networks, ITU-T Telecommunication Standardization Sector of ITU G.997.1 (Jun. 2012) (150 pages).
"Fast access to subscriber terminals (G.fast)—Physical layer specification" Series G: Transmission Systems and Media, Digital Systems and Networks Access networks—Metallic access networks, ITU-T Telecommunication Standardization Sector of ITU G.9701 (Dec. 2014) (324 pages).
International Preliminary Examination Report, issued in PCT/GB2015/050955 dated Oct. 13, 2016 (7 pages).
International Search Report for PCT/GB2015/050955 dated Jun. 12, 2015, 3 pages.

* cited by examiner

DATA COMMUNICATION

This application is the U.S. national phase of International Application No. PCT/GB2015/050955 filed 30 Mar. 2015 which designated the U.S. and claims priority to EP 14250068.5 filed 31 Mar. 2014 and GB 1405944.8 filed 2 Apr. 2014, the entire contents of each of which are hereby incorporated by reference.

FIELD OF INVENTION

The present invention relates to data communication. In particular, it relates to modifying operation of digital subscriber line (DSL) equipment in access networks.

INTRODUCTION

Digital subscriber line (DSL) technology is designed to provide digital communication over twisted copper pair subscriber lines using discrete multitone modulation (DMT). With DMT, transmit data is distributed over a number of channels, each channel modulating a different small-bandwidth carrier, also known as a "tone". In rate-adaptive DSL, the number of bits per symbol on a channel may vary depending on the data-handling capacity of the channel so as to obtain the optimum overall bit rate from the line at any given moment in time.

DSL is a collective term to cover a number of variants of DSL technology, comprising G.Fast, ADSL, ADSL2, ADSL2+, SDSL, VDSL and VDSL2 (including associated annexes) among others. A DSL connection comprises a copper subscriber line extending between two DSL transceivers, each comprising a DSL modem. A first DSL transceiver is typically located at the customer's premises, and the second transceiver may be provided in a DSLAM (a form of aggregation transceiver device) comprising several DSL transceivers (one for each subscriber line). In order to enjoy the benefits of high speed transmission over traditional copper pairs, the DSLAM is increasingly being located closer to the customer at the distribution point or DP (sometimes known as 'drop point') instead of at the exchange (known as the 'central office' in US terminology). Connections between the local exchange and the DSLAM are optical fiber, such that the length of the copper subscriber line (with its inherent data rate limitations) is reduced. The DSLAM connects the DSL transceiver at the customer's premises to the core network of the communications provider.

Dynamic line management (DLM) and dynamic spectrum management (DSM) are techniques for improving operation of DSL technology over a DSL communications line. Both DSM and DLM work by assessing the DSL transmission performance over the line and adjusting sets of DSL transceiver attributes (also known as profiles) to improve the performance of the DSL technology currently being used on the line. DSL transceiver attributes are defined in G.997.1, section 7.3: "Configuration functions", which includes section 7.3.1 "Line configuration parameters" and section 7.3.2 "Channel configuration parameters". The DSL transceiver attributes determine the operation of the DSL transceivers in the DSLAMs in the network to determine how the DSL technology in use on the line is implemented. The DSL transceiver attributes are selected based on assessment of the performance of the line. DSL transceiver profiles are maintained by the network operator providing the DSL access service. DLM applies one of a finite number of profiles to the DSLAM with the aim of improving stability of operation of the DSL technology currently being used on the line, although this can result in a reduction in the synchronization rate. A number of DSL technologies have low-power modes specified or under discussion, including G.Fast, ADSL2 and VDSL2, however, DLM may be unable to correctly interpret performance of the line when in low-power mode.

SUMMARY OF THE INVENTION

The invention enables DSL transmission performance over the line to be assessed and sets of DSL transceiver attributes (also known as profiles) to be adjusted to select the optimum DSL technology. The invention allows evaluation of alternative sets of DSL transceiver attributes that may be required to optimize the line.

The invention provides a method of controlling a digital subscriber line (DSL) transceiver for use in transferring data over a DSL connection, the method comprising: monitoring operation of the DSL connection; detecting that the DSL connection is operating in a low power mode in which the signal power applied to the DSL connection by the DSL transceiver is at a first level below a power threshold value; increasing the signal power applied to the DSL connection to a second level above the power threshold value; recording data indicative of performance of the DSL connection with signal power applied to the DSL connection at the second level; and modifying DSL transceiver attributes based on the recorded data indicative of performance, to change operation of the DSL transceiver in transferring data over the DSL connection.

According to an aspect of the invention, if it is desired to adopt a new set of DSL transceiver attributes while the DSL transceiver is operating in low power mode, the DSL line is excited into full power mode to allow selection of a set of DSL transceiver attributes to alter operation of the DSL transceiver. Following a change in DSL transceiver attributes, while the DSL transceiver is operating in the low power mode, the DSL line may be excited into full power mode to allow evaluation of the performance of the new set of DSL transceiver attributes and a decision taken to either stay with the new set of DSL transceiver attributes, revert to the original set of DSL transceiver attributes or try a new set of DSL transceiver attributes.

The invention also provides a DSL controller for controlling a digital subscriber line (DSL) transceiver for use in transferring data over a DSL connection, in which the controller comprises: a line interface for monitoring performance of the DSL connection; a processor for detecting that the DSL connection is operating in a low power mode in which the signal power applied to the DSL connection by the DSL transceiver is at a first level below a power threshold value; a management interface for sending control information to the DSL transceiver for increasing the signal power applied to the DSL connection to a second level above the power threshold value; a processor for recording data indicative of performance of the DSL connection with signal power applied to the DSL connection at the second level; and
a management interface for sending control information to the DSL transceiver based on the recorded data indicative of performance, for modifying DSL transceiver attributes to change operation of the DSL transceiver in transferring data over the DSL connection.

BRIEF DESCRIPTION OF THE DRAWINGS

In order that the present invention may be better understood, embodiments thereof will now be described, by way of example only, with reference to the accompanying drawings in which.

DETAILED DESCRIPTION OF EMBODIMENTS

Figure 1:
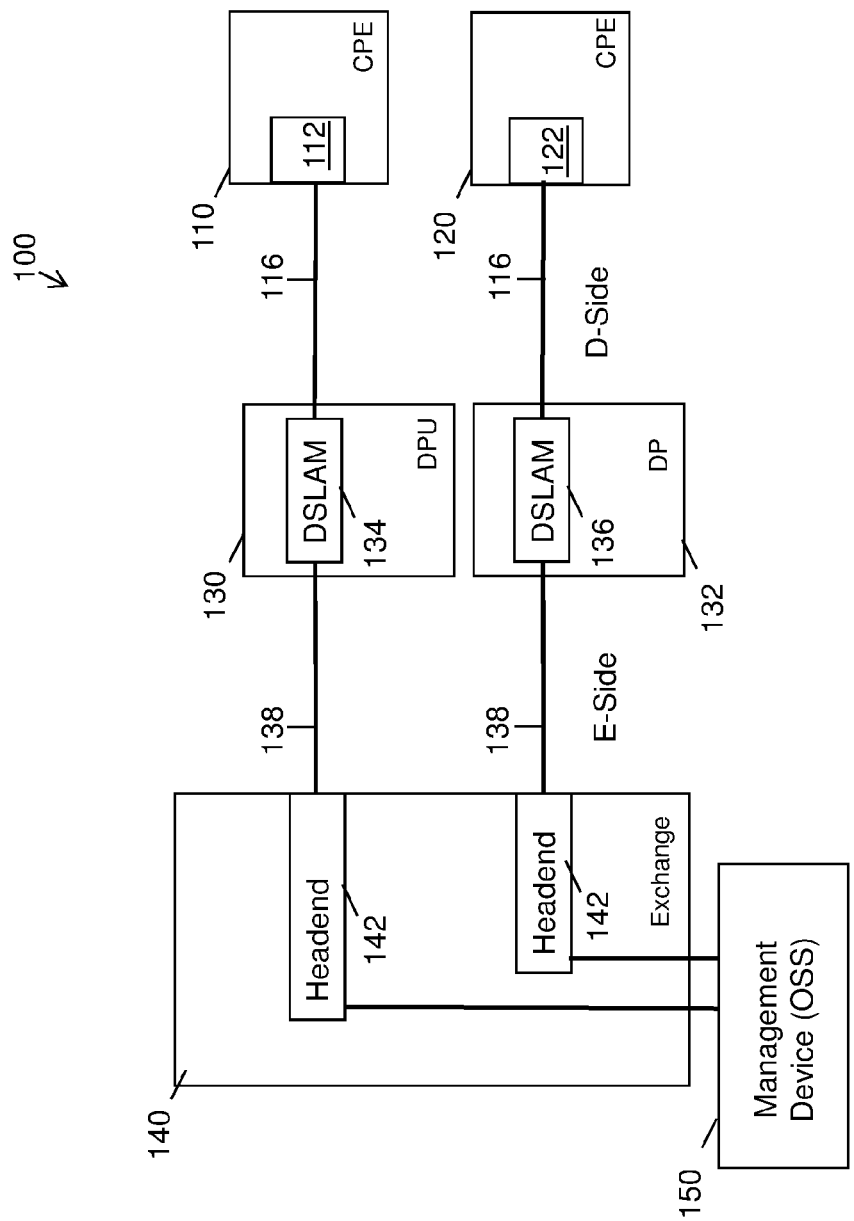
FIG. 1 shows a schematic block diagram of an access network for implementing the present invention.

The invention allows modifying the operation of a DSL transceiver for transferring data over a DSL connection between DSL transceivers. The invention works by detecting (i.e. by monitoring operation of the DSL connection) that the DSL connection is operating in a low power mode (i.e. in which the signal power applied to the DSL connection by the DSL transceiver is at a first level below a power threshold value). The first DSL transceiver is reconfigured to increase the signal power applied to the DSL connection to a second level above the power threshold value and data indicative of performance of the DSL connection is recorded with signal power at the second level. The first DSL transceiver is then reconfigured based on the recorded performance data, for use in transferring data over the DSL connection between the DSL transceivers.

A DSL transceiver comprises a DMT modulator (not shown) which generates symbols that modulate the various DSL tones. When a DSL connection is operative (sometimes referred to as "showtime") several types of DMT symbol may be generated, not all of which actually communicate user data (i.e. data generated by the user or data intended for the user). These symbol types are defined in G.9701 and include data symbols which carry a data frame (e.g. user data) but also sync symbols used for synchronization and channel estimation but which bear no data frame and idle symbols that may be sent if no data frame is available for transmission. Quiet symbols result when the modulator input for each tone is set to zero and will put the transceiver into a low power state to minimize power consumption. Another frame type is the robust management channel (RMC) frame that contains, not user data but management and control information.

Low power mode may be particularly important for the DSL transceiver at the DP due to the way the DP is powered. The DSL transceiver at the DP may be powered over the communications line from the customer's premise (so-called "reverse-feed"). During periods of user inactivity, i.e. when transmit data buffers are below a set fill level and little or no data is being sent to the line, reverse-feed G.fast systems are designed to drop into a low power mode. In low-power mode, both the signal power and data rate applied to the line by the DP DSL transceiver is reduced to a level lower than normal (i.e. lower than when in full-power mode) and possibly to zero. When the DP transceiver transmit data buffers receive more data, the line will automatically return to full power operation. A further low-power mode may be entered on power failure. The reverse-feed power may fail, periodically, e.g. when customer premise equipment (CPE) supplying power to the DP is switched off. In the event of a power failure, the DP may fall back on a battery power supply in the customer's home and adopt a low-power mode with both the signal power and data rate applied to the line by the DP DSL transceiver reduced. Where a DSL transceiver has entered low-power mode, for whatever reason, this may prevent DLM from correctly interpreting performance of the line due to the reduced power and data rate.

G.Fast

Figure 2:
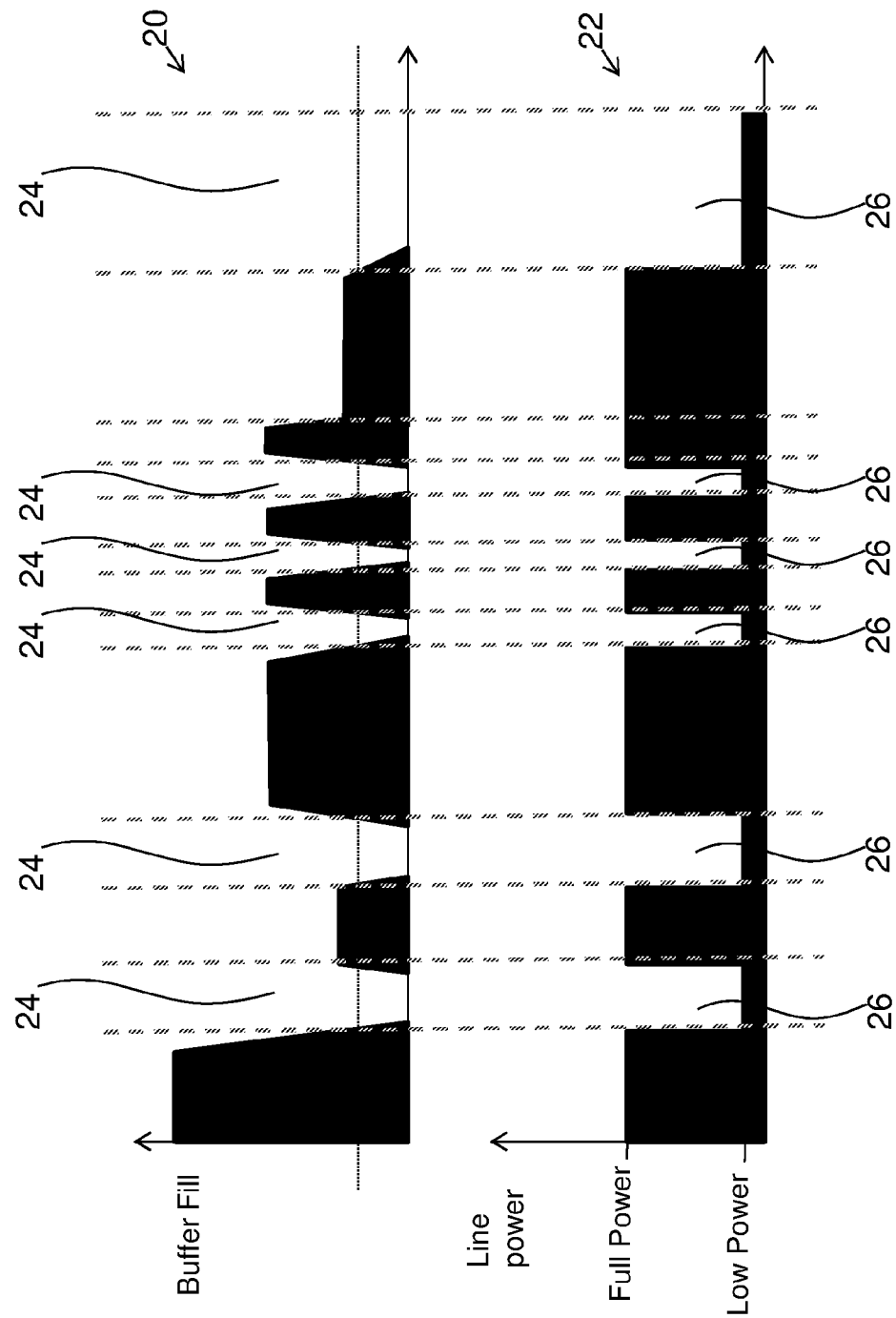
FIG. 2 illustrates a conventional relationship between transmit buffer fill level and power applied to the line.

The power-saving design of conventional G.Fast DSL transceivers means their operation is tightly coupled to the presence of user data—i.e. when there is user data available in the transmit buffer, the transceiver will run at full power but when the transmit buffer empties (e.g. resulting in generation of quiet symbols), the transceiver will revert to a low-power mode. The low-power mode may be associated with a low power level an order of magnitude less than the full power level. This is represented in the graphs of FIG. 2. FIG. 2 shows a comparison of DSL transceiver transmit data buffer fill levels, at graph 20, with corresponding power levels sent to the line, at graph 22. It will be noted that, whenever there is data in the buffer, either at a high level or a low level, the line operates at full power. However whenever traffic levels fall to zero (i.e. transmit data buffer is empty), as shown at 24, the power sent to the line operates at a low power level, as shown at 26.

In practice, more than one low-power level may be available. For example, the following power states are defined in G.997.1 at 7.5.1.5 with additional power states expected to be defined in the futures:

L0—Full power—when the line has full transmission (i.e. showtime).

L1—Power down data transmission—when there is transmission on the line but the net data rate is reduced (e.g., only for OAM and higher layer connection and session control). This state applies to G.992.2 only.

L2—Power down data transmission—when there is transmission on the line but the net data rate is reduced (e.g., only for OAM and higher layer connection and session control). This state applies to G.992.3 and G.992.4 only;

L3—No-power—when no power is transmitted on the line at all.

However, other low-power states are under discussion, for example:

L2.0—Reduced power state—in this state the transceiver does not transmit user data in each symbol, i.e. punctured transmission.

L2.1 (normal)—Reduced power state—in this state the transceiver does not transmit in every frame and only transmits data (which may include a low level of user data) through management (RMC) symbols, rather than data symbols. Fewer management and sync symbols are transmitted when compared to full-power mode.

DLM is a centralized system that collects DSL performance data on a periodic basis and then modifies, via OSS systems, new DSL transceiver attributes to individual DSL transceivers to ensure they operate in a stable manner. When the line is in low power mode, it is not representative of the performance at full power and, as a result, DLM cannot be used to obtain a true indication of the performance of the DSL connection.

FIG. 1 shows a schematic block diagram of a typical access network in which the invention may be implemented. Access network 100 comprises customer premises DSL interfaces 110, 120, typically DSL routers, each connected by a different one of D-side copper pair lines 116 to a different DP 130, 132. Both DPs 130, 132 are connected into the same exchange 140 by a different one of E-side optical fiber lines 138. Customer premises DSL interfaces 110,120 comprise DSL transceivers 112,122, respectively. Other CPE, such as computers and media players (not shown), can connect via one of DSL interfaces 110, 120 in order to communicate with remote data networks, such as the internet, using DSL technology. Each DP 130, 132 comprises a DSLAM 134, 136. DSLAMs 134, 136 are connected to exchange 140 for interconnection to remote data networks, such as the internet and to other operators via exchange headends 142. DSL communication is set up between each of customer premise DSL transceivers 112, 122 and one of DSLAMs 134, 136. Communication between customer premises DSL interfaces 110, 120 and exchange 140 is partially by DSL over copper pair and partially by optical fiber. Communication between CPE DSL transceivers 112, 122 and DP DSLAMs 134, 136, is by DSL over copper pairs 116, while communication between DP DSLAMs 134, 136 and exchange headends 142 is by Ethernet over optical fibers 138. Operation of each DSLAM 134, 136 is managed by and management device 150, part of the network provider's operations support service (OSS). Management device 150 may comprise a server computer comprising a processor for executing and memory for storing appropriate software components.

An embodiment of the invention will now be described with reference to FIG. 3.

Figure 3:
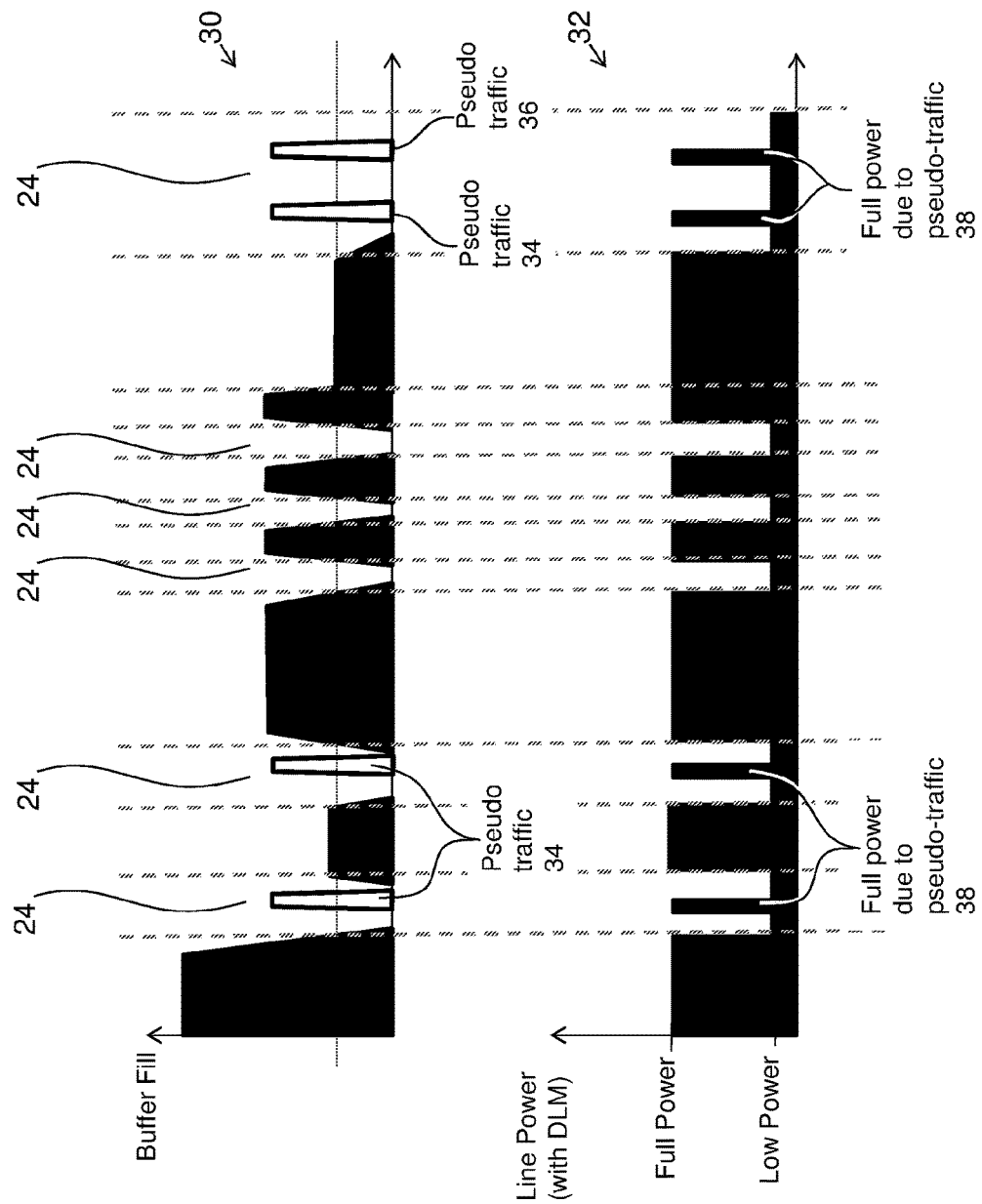
FIG. 3 illustrates a relationship between transmit buffer fill level and power applied to the line according to an aspect of the invention.

In FIG. 3, graph 30 shows DSL transceiver transmit buffer fill levels on the line with corresponding power levels sent to the line shown in graph 32. DSL transceiver transmit data buffer fill levels shown in graph 30 are similar to those of graph 20 in FIG. 2. In fact the data buffer fill levels shown in solid black in graph 30 are the same as the data buffer fill levels shown in graph 20. The data buffer fill levels of graph 30 differs from graph 20 in that it now has pseudo or "non-user" data (i.e. dummy frames) 34, 36 added during the periods 24 where data buffer fill levels previously fell to zero (i.e. transmit data buffer is empty). The non-user data 34, 36 injected on the line need not occupy the whole of any period 24 without user data but needs to be present long enough for DLM to assess performance of the DSL transmission over the line (for example, a 15-minute slot). Injection of the non-user data causes the DSL transceiver to excite the line to full power for periods 38, roughly matching the periods of non-user data 34, 36. This enables DLM to assess line performance and select a new set of DSL transceiver attributes, where appropriate, i.e. where this is calculated to improve performance. This is achieved without affecting user data, as no user data is sent at the same time as the non-user data. According to a further embodiment, the DSL transceiver is controlled to send further non-user data to the line to allow DLM to assess operation with the new set of DSL transceiver attributes. For example, where the set of DSL transceiver attributes is changed after the sending the third set of non-user data 34, assessing the DSL transmission performance over the line and adjusting sets of DSL transceiver attributes, an additional set of non-user data 36 may be sent and DLM activated to check if performance operating to the new set of DSL transceiver attributes meets expectations.

According to a further embodiment of the invention, non-user data can be generated by the DP outside of the G.Fast transceiver to which the non-user data is fed and which simply sees it as user data. Alternatively, the G.Fast transceiver is modified to generate non-user data.

According to a further embodiment of the invention, non-user data is discarded by the recipient end users DSL transceiver. This may be arranged by associating the non-user data with an invalid port number or by sending operations and maintenance (OAM) packets or test packets. Suitable packets are specified in ITU Y.1731 OAM functions and mechanisms for Ethernet based networks.

A further embodiment of the invention does away with the need to generate non-user data. According to this embodiment, the G.Fast transceiver is modified to generate an input to the power mode controller part of the G.Fast transceiver to control whether the DSL transceiver operates in full-power mode or low-power mode. This may be implemented by a change to the firmware embedded in the G.Fast transceiver.

For assessment of DSL transmission performance over the line operating under a set of DSL transceiver attributes, DLM monitors data comprising one or more of error rates and the numbers of retrains, retransmissions, etc. on the line. DLM may compare the performance of the line operating under the current set of DSL transceiver attributes with the performance of the line operating under a previous set of DSL transceiver attributes to determine which is better and whether to switch set of DSL transceiver attributes.

Overview of a Method According to an Embodiment of the Invention.

The DP forces the transceiver out of low power state to full power state, either by writing non-user data (i.e. fake data not originating with or destined for the user) to the transmit buffer or using an interface to the power state controller for the line to force the line to full power. Data on DSL performance is captured, the data analyzed and a decision taken on whether or not to change the DSL configuration. The decision may be based on a comparison of current performance with performance in a previous period using a different set of DSL transceiver attributes. Depending on the decision, the current set of DSL transceiver attributes may be kept or a different set of DSL transceiver attributes applied. According to a preferred embodiment, hysteresis (e.g. configurable hold-off timers) is applied in the decision making process to ensure that DLM does not switch configurations due to short-duration poor performance.

Figure 4:
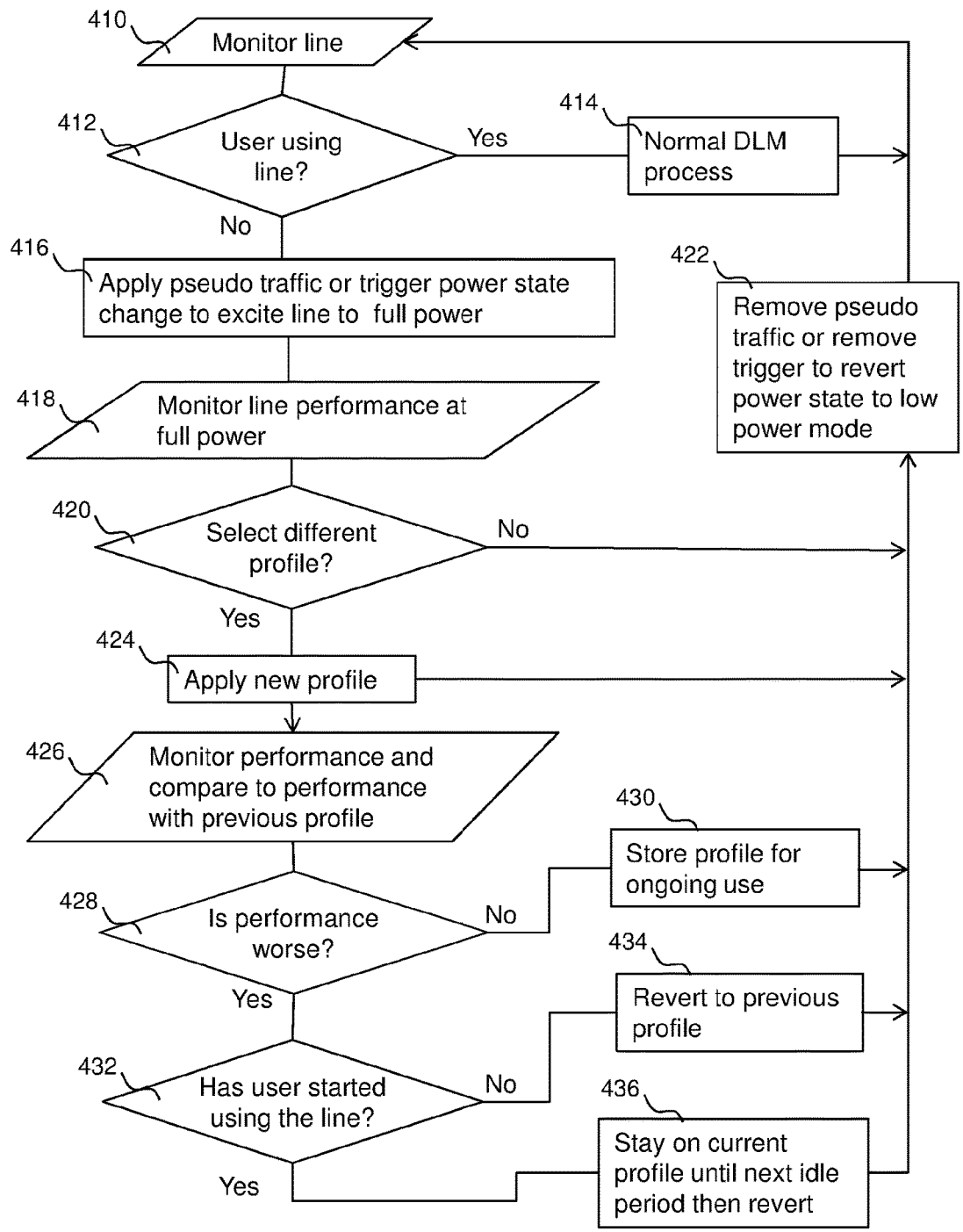
FIG. 4 shows a process flow diagram according to an aspect of the invention.
Figure 5:
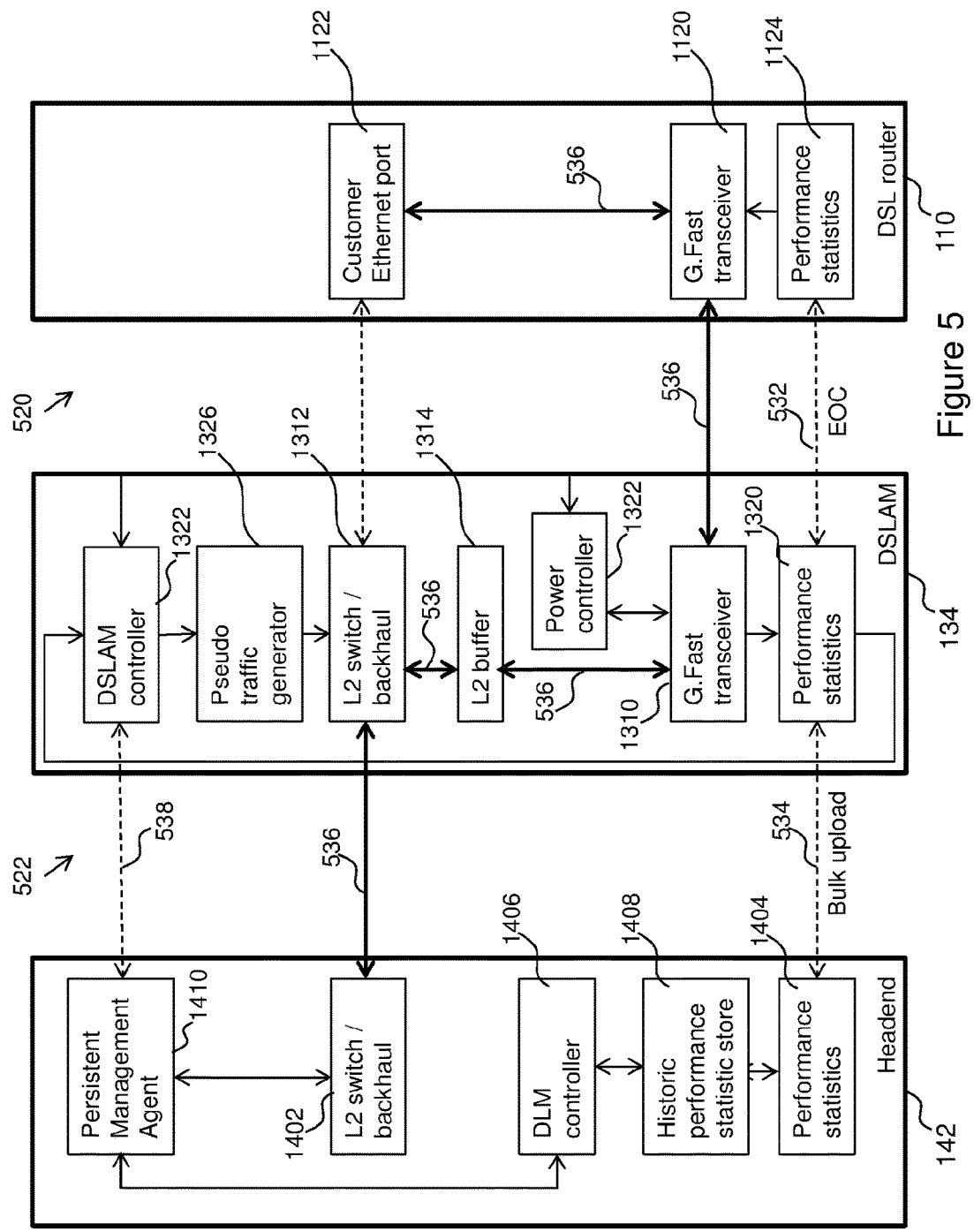
FIG. 5 shows the access network of FIG. 1 in more detail.

A method according to an embodiment of the invention will now be described in detail with reference to the flow chart of FIG. 4. The flow chart of FIG. 4 starts at state 410 "monitor line" in which the DSL connection is monitored to obtain indications as to whether or not the line is carrying user data. Decision 412 "user using line?" uses the indications obtained at 410. If decision is positive (i.e. user is using the line), normal processing is followed, as indicated at state 414 and control returns to state 410. If decision is negative (i.e. user is not using the line), the line is excited to full power at 416, e.g. by applying non-user data or triggering a power state change directly. With the line forced to full power, line performance is monitored, as indicated above, at 418 "Monitor line performance at full power". Decision 420 "Select different profile?" uses the indications obtained at 418 to decide whether line performance is likely to be enhanced by changing to a different profile. If decision is negative (i.e. do not change to a different profile), the excitation to full power is removed at 422 and control returns to state 410. If decision is positive (i.e. change to a different profile), the selected different profile is applied at state 424. According to one alternative embodiment of the invention, the excitation to full power is removed at 422 and control returns to state 410.

According to a second, alternative embodiment of the invention, it is desired to check performance of the line using the selected different profile applied at state 424. In this alternative, control passes to state 426 "Monitor performance and compare to performance with previous profile". Decision 428 "Is performance worse?" uses indications obtained at 426 as to comparative performance.

If decision is negative (i.e. performance with the selected profile is no worse), the current profile is stored at sate 430 for ongoing use, the excitation to full power is removed at 422 and control returns to state 410. If decision is positive (i.e. performance with the selected profile is worse), a check is carried out at 432 as to whether or not the user has started using the line (for this purpose, line monitoring at 426 will also provide suitable indications of user activity).

If decision is negative (i.e. the user has not started using the line), the previously used profile is reverted to at state 434, the excitation to full power is removed at 422 and control returns to state 410. If decision is positive (i.e. the user has already started using the line), a flag is set at state 436 to allow the current profile to be kept but to cause the previous profile to be reverted to on the next occasion that it is detected that the user is not using the line, the excitation to full power is removed at 422 and control returns to state 410.

Overview of an Implementation According to an Embodiment of the Invention.

User data is communicated between DSL transceiver 112 and exchange headend 142 by DSL over copper connection 520, DSLAM 134 and optical fiber connection 522. The physical components have already been described, above, with reference to FIG. 1, however, we now look at these components in more detail.

DSL router 110 comprises DSL (e.g. G.Fast) transceiver 1120 for communicating via DSL connection 520 and Customer Ethernet port 1122 for communicating with other CPE, such as computers and media players (not shown).

DSLAM 134 comprises DSL (e.g. G.Fast) transceiver 1310 for communicating via DSL connection 520, Layer 2 backhaul switch 1312 for communicating via optical fibre connection 522 and Layer 2 data buffer 1314 for buffering data received from or destined for either of connections 520 and 522.

Exchange 140 comprises headend Layer 2 backhaul switch 1422 for communicating via optical fiber connection 522.

Data path 536 is followed by user data that is communicated between DSL router 110 and headend 142 as follows. User data is exchanged with the other CPE (not shown) by Customer Ethernet port 1122 via well-known customer premise wired or wireless links (not shown) and with CPE DSL transceiver 1120 via electrical wiring internal to the DSL transceiver. User data is exchanged between CPE DSL transceiver 1120 and Customer Ethernet port 1122 via DSL connection 520 and between DSLAM DSL transceiver 1310 and DSLAM Layer 2 backhaul switch 1312 via Layer 2 buffer 1314 and electrical wiring internal to the DSLAM. User data is exchanged between DSLAM Layer 2 backhaul switch 1312 and headend Layer 2 backhaul switch 1402. User data is exchanged between headend Layer 2 backhaul switch 1402 and remote data networks, such as the internet, and to other operators by well-known backhaul circuits (not shown).

The access network components of FIG. 1 also comprise management and control elements, as follows.

DSLAM 134 also comprises DSLAM performance statistics management component 1320. DSL router 110 also comprises DSL router performance statistics management component 1124. DSLAM performance statistics management component 1320 derives performance data from DSLAM DSL transceiver 1310 and shares it with exchange 140 and DSL router 110. DSLAM performance statistics management component 1320 receives management and performance data via a virtual management channel 532 from DSL router performance statistics management component 1124, which monitors CPE DSL transceiver 1120. DSLAM performance statistics management component 1320 also exchanges management and performance data via a virtual management channel 534 with Headend performance statistics management component 1424.

Headend 142 also comprises DLM controller 1426, which controls monitoring of DSL performance and configuration of DSL transceivers to improve DSL performance. DLM controller 1424 accesses performance data from local historic performance statistic store 1428, which in turn is fed by Headend 142 performance statistics management component 1424 with data a received form DSLAM 134.

DSLAM 134 also comprises DSLAM controller 1322, which manages operation of the DSLAM 134. To this end, DSLAM controller 1322 receives management and performance data from DSLAM performance statistics management component 1320 and has an interface to DSLAM power controller 1324 via which it monitors and can adjust the power setting of DSL connection 520, for example forcing DSL connection 520 to full power from a low-power mode. DSLAM controller 1322 also has an interface to DSLAM non-user data generator 1326 via which it can initiate insertion of non-user data onto DSL connection 520, so as to switch it to full power from a low-power mode.

Exchange 140 may also comprise persistent management agent (PMA) 410. PMA 1410 act as a proxy/manager for DSLAM 134. DSLAM 134 is configured to send, via virtual channel 538, metric data to associated PMA 1410 as soon as it is generated. To this end PMA 1410 has an interface to Layer 2 backhaul switch 1402. The PMA may then handle all requests relating to the status and configuration of the DSLAM 3. PMA 1410 is able to determine the power status of the DSLAM 134. According to further embodiments, PMA 1410 is also able to perform other actions including:

Firmware download and management;
Initial provisioning;
Configuration, including rate control;
Test and diagnostics;
Statistics gathering; and
Event reporting.

In this embodiment, PMA 1410 is a proxy for a single DSLAM 134 although other mappings are envisaged. PMA 1410 performs aggregation of metric data to generate new measures and values.

REFERENCES

G.9701 G.Fast recommendation (describes the low power modes of G.Fast); ITU-T; Amendment 1 draft circulated for comments March 2014.
G.997.1 Physical layer management for digital subscriber line transceivers; ITU-T; June 2012.
G.992.2 Splitterless asymmetric digital subscriber line (ADSL) transceivers; ITU-T; June 1999.
G.992.3 Asymmetric digital subscriber line transceivers 2 (ADSL2), ITU-T; April 2009
G.992.4 Splitterless asymmetric digital subscriber line transceivers 2 (splitterless ADSL2); ITU-T; July 2002.
G.993.2 Very high speed digital subscriber line transceivers 2 (VDSL2); ITU-T (December 2011)
Y.1731 OAM functions and mechanisms for Ethernet based networks; ITU-T; November 2013.

The invention claimed is:

1. A method of controlling a digital subscriber line (DSL) transceiver for use in transferring data over a DSL connection, the method comprising:

monitoring operation of the DSL connection;

detecting, based on the monitored operation of the DSL connection, that the DSL connection is operating in a low power mode in which the signal power applied to the DSL connection by the DSL transceiver is at a first level below a power threshold value, the low power mode corresponding to a period of user inactivity of the DSL connection;

increasing the signal power applied to the DSL connection to a second level above the power threshold value upon the detection that the DSL connection is operating in the low power mode corresponding to the period of user inactivity of the DSL connection;

recording data indicative of performance of the DSL connection with signal power applied to the DSL connection at the second level;

deciding based on the recorded data indicative of performance whether line performance is likely to be enhanced by changing to a selected different profile; and modifying DSL transceiver attributes based on the recorded data indicative of performance, to change operation of the DSL transceiver in transferring data over the DSL connection the selected different profile.

2. The method as claimed in claim 1 comprising increasing the signal power applied to the DSL connection above the power threshold value by increasing the data rate applied to the DSL connection.

3. The method as claimed in claim 2 comprising increasing the data rate applied to the DSL connection by applying non-user data to the DSL connection.

4. The method as claimed in claim 3 in which the DSL connection provides service to a user, in which the non-user data is data not generated by and not intended for the user.

5. The method as claimed in claim 1 wherein
the low power mode corresponds to operating the DSL transceiver in a low data-rate mode in which the data-rate applied to the DSL connection by the DSL transceiver is below a data-rate threshold level; and
in which increasing the signal power applied to the DSL connection to the second power level comprises increasing the data rate applied to the DSL connection by the DSL transceiver above the data-rate threshold value.

6. The method as claimed in claim 5 in which the data rate is derived from monitoring communication of user data and non-user data over the connection.

7. The method as claimed in claim 6 in which the DSL connection provides service to a user, in which the user data is data generated by or intended for the user and the non-user data is data not generated by and not intended for the user.

8. The method as claimed in claim 2 in which increasing the data rate applied to the DSL connection comprises increasing the rate of discrete multitone modulation (DMT) symbols applied to the DSL connection.

9. The method as claimed in claim 2 in which increasing the data rate applied to the DSL connection comprises increasing the number of DMT tones applied to the DSL connection.

10. The method as claimed in claim 2 in which increasing the data rate applied to the DSL connection comprises increasing the number of DMT transmission slots applied to the DSL connection.

11. The method as claimed in claim 1 comprising, following changing operation of the DSL transceiver, reconfiguring the DSL transceiver to decrease the signal power applied to the DSL connection to a level below the power threshold value.

12. A DSL controller for controlling a digital subscriber line (DSL) transceiver for use in transferring data over a DSL connection, in which the controller comprises:

a line interface for monitoring performance of the DSL connection;

a processor for detecting, based on the monitoring performance of the DSL connection, that the DSL connection is operating in a low power mode in which the signal power applied to the DSL connection by the DSL transceiver is at a first level below a power threshold value, the low power mode corresponding to a period of user inactivity of the DSL connection;

a management interface for sending control information to the DSL transceiver for increasing the signal power applied to the DSL connection to a second level above the power threshold value upon the detection that the DSL connection is operating in the low power mode corresponding to the period of user inactivity of the DSL connection;

a processor for recording data indicative of performance of the DSL connection with signal power applied to the DSL connection at the second level, deciding based on the recorded data indicative of performance whether line performance is likely to be enhanced by changing to a selected different profile; and a management interface for sending control information to the DSL transceiver based on the recorded data indicative of performance, for modifying DSL transceiver attributes to change operation of the DSL transceiver in transferring data over the DSL connection to the selected different profile.

13. The DSL controller as claimed in claim 12 wherein the control information sent to the DSL transceiver increases the signal power applied to the DSL connection above the power threshold value by increasing the data rate applied to the DSL connection.

14. The DSL controller as claimed in claim 13 wherein the data rate applied to the DSL connection is increased by applying non-user data to the DSL connection.

15. The DSL controller as claimed in claim 12 wherein
the low power mode corresponds to operating the DSL transceiver in a low data-rate mode in which the data-rate applied to the DSL connection by the DSL transceiver is below a data-rate threshold level; and
increasing the signal power applied to the DSL connection to the second power level comprises increasing the data rate applied to the DSL connection by the DSL transceiver above the data-rate threshold value.

16. The DSL controller as claimed in claim 15 wherein the data rate is derived from monitoring communication of user data and non-user data over the connection.

17. The DSL controller as claimed in claim 13 wherein increasing the data rate applied to the DSL connection comprises increasing the rate of discrete multitone modulation (DMT) symbols applied to the DSL connection.

18. The DSL controller as claimed in claim 13 wherein increasing the data rate applied to the DSL connection comprises increasing the number of DMT tones applied to the DSL connection.

19. The DSL controller as claimed in claim 13 wherein increasing the data rate applied to the DSL connection comprises increasing the number of DMT transmission slots applied to the DSL connection.

20. The DSL controller as claimed in claim 12 wherein following changing operation of the DSL transceiver, the management interface for sending control information to the DSL transceiver based on the recorded data indicative of performance sends information to reconfigure the DSL transceiver to decrease the signal power applied to the DSL connection to a level below the power threshold value.

\* \* \* \* \*